(12) United States Patent
Hong et al.

(10) Patent No.: US 10,718,571 B2
(45) Date of Patent: Jul. 21, 2020

(54) SPIRAL HEAT EXCHANGER AS PREHEATER IN POLYMER DEVOLATILIZATION PROCESSES

(71) Applicants: Yifeng Hong, Houston, TX (US); Jay L. Reimers, Houston, TX (US)

(72) Inventors: Yifeng Hong, Houston, TX (US); Jay L. Reimers, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/646,987

(22) Filed: Jul. 11, 2017

(65) Prior Publication Data

US 2018/0058764 A1 Mar. 1, 2018

Related U.S. Application Data

(60) Provisional application No. 62/381,777, filed on Aug. 31, 2016.

(51) Int. Cl.
| | | |
|---|---|---|
| *C08F 6/00* | (2006.01) |
| *C08F 10/02* | (2006.01) |
| *C08F 110/02* | (2006.01) |
| *F28D 7/16* | (2006.01) |
| *F28D 7/04* | (2006.01) |
| *F28D 21/00* | (2006.01) |
| *C08F 6/10* | (2006.01) |
| *C08F 6/12* | (2006.01) |

(52) U.S. Cl.
CPC ............ *F28D 7/1676* (2013.01); *C08F 6/003* (2013.01); *F28D 7/04* (2013.01); *C08F 6/10* (2013.01); *C08F 6/12* (2013.01); *F28D 2021/0022* (2013.01)

(58) Field of Classification Search
CPC ................. C08F 2/01; C08F 6/12; C08F 6/10
USPC .......................................................... 526/88
See application file for complete search history.

(56) References Cited

U.S. PATENT DOCUMENTS

| | | | |
|---|---|---|---|
| 3,812,897 A | 5/1974 | Latinen | |
| 4,471,095 A * | 9/1984 | Wassen ................... C08F 10/00 |
| | | | 526/65 |

(Continued)

FOREIGN PATENT DOCUMENTS

CN      2209156      10/1995

OTHER PUBLICATIONS

Green et al. Ed., "Chapter 11: Heat Transfer Equipment," Perry's Chemical Engineers' Handbook, 8th Edition, McGraw-Hill, New York, 2007, pp. 11-1 thru 11-112.

*Primary Examiner* — Rip A Lee

(57) ABSTRACT

This invention relates to a process for forming polymer including: polymerizing a monomer dissolved in a solvent in the presence of a catalyst system under conditions to obtain a first effluent stream including a solution of the polymer and the solvent; heating the first effluent stream in at least one spiral heat exchanger to produce a second effluent stream, where the first effluent stream flows through the spiral heat exchanger in a cross-flow direction relative to spirals of the spiral heat exchanger and performing a separation on the second effluent stream to produce: a third effluent stream including polymer substantially free of the solvent; and a recycle stream including the solvent and unreacted monomer. Processes for devolatilizing a polymer stream are also provided herein.

16 Claims, 3 Drawing Sheets

(56) References Cited

U.S. PATENT DOCUMENTS

| | | | |
|---|---|---|---|
| 4,808,262 | A | 2/1989 | Aneja et al. |
| 4,954,303 | A | 9/1990 | Moore et al. |
| 5,024,728 | A | 6/1991 | Morita et al. |
| 5,453,158 | A | 9/1995 | Cummings et al. |
| 6,117,939 | A * | 9/2000 | Mathauer ............ B01J 19/0013 524/457 |
| 6,479,624 | B2 | 11/2002 | Wepener et al. |
| 6,660,814 | B1 * | 12/2003 | Kroner ................. B01J 19/1881 526/88 |
| 7,332,058 | B2 | 2/2008 | Reimers |
| 9,708,428 | B2 | 7/2017 | Reimers et al. |
| 2001/0039329 | A1 | 11/2001 | Wepener et al. |
| 2017/0088647 | A1* | 3/2017 | Reimers ................ C08F 210/16 |

* cited by examiner

SPIRAL HEAT EXCHANGER AS PREHEATER IN POLYMER DEVOLATILIZATION PROCESSES

PRIORITY CLAIM

This application claims priority to U.S. Provisional Application Ser. No. 62/381,777 filed Aug. 31, 2016, the disclosure of which are fully incorporated herein by its reference.

FIELD OF THE INVENTION

This invention relates to novel polymerization processes using at least one spiral heat exchanger.

BACKGROUND OF THE INVENTION

Polymerization processes for producing polymers, such as polyolefins, typically require removal of unreacted monomers and solvents (i.e., volatile components) from final product. The monomers and solvents are subsequently recycled back into the polymerization process. Usually, removal of the monomers and solvents is achieved through devolatilization of the polymer solution stream. Devolatilization may be achieved by raising the temperature of the polymer solution, e.g., above the boiling point of the polymer solution, and removing the volatile components. The partial pressure of the volatile components may also be lowered. For example, a polymer solution stream may be passed through a preheater and then introduced into a devolatilizer, such as a chamber or vessel, with reduced pressure.

Typically, shell and tube heat exchangers and plate heat exchangers have been used as the preheater during devolatilization. A shell and tube heat exchanger (STHE) consists of a shell containing a bundle of tubes where the polymer solution may flow through the tubes (tube side) and a heating fluid may flow outside the tubes but inside the shell (shell side) to transfer heat between the polymer solution and the heating fluid. For example, EP 0359432 generally discloses a STHE used as a preheater, which is connected to a vacuum vessel with a distributor to reshape the polymer strands. US EP0359432 reports a STHE connected to a devolatilizer through a plate-like distributor for devolatilizing a polymer solution with high solid content. Additionally, U.S. Pat. No. 4,954,303 discloses a STHE mounted on top of a vacuum chamber with a low shear rate mixer for increasing volatile vaporization surface area.

A plate heat exchanger (PHE) consists of multiple heated flat plates arranged in layers having channels connecting an interior portion where a polymer solution is introduced and an exterior portion where the polymer solution may be heated and devolatilized. For example, U.S. Pat. No. 5,453,158 reports a PHE with varying channel width, which is embedded in a closed shell to devolatilize a polymer solution and U.S. Pat. No. 4,808,262 discloses a method for devolatilizing polymer solutions by heating the polymer solutions.

Although STHE and PHE have been used as preheaters during devolatilization of polymer solution for many years, there still exists many problems with their use. In particular, polymer solution undergoing devolatilization usually has a high solid content (e.g., about 15 wt % to about 90 wt %) rendering it a highly viscous laminar fluid. Thus, a large heat transfer area is required to meet the necessary heat transfer efficiency. With respect to STHE, a large heat transfer area translates into an increase in tube number and shell size resulting in increased equipment size and cost. Moreover, such an increase in tube number and shell size can lead to an undesirably high pressure drop as polymer solution flows through the tubes; thus, requiring more expensive pumps. Furthermore, where tube diameter is large, a high radial temperature gradient can exist. For example, a maximum radial temperature difference can be as high as 300° F. (149° C.) when a 0.75 inch tube diameter is used. A high radial temperature gradient where there is a high temperature close to the tube wall can cause degradation of polymer while low temperature close to the center of the interior of the tube can hinder devolatilization. As discussed in Green, D. W., Perry, R. H. (Editors) Perry's Chemical Engineers' Handbook (8th Edition). Chapter 11: Heat Transfer Equipment. McGraw-Hill, New York, 2007, while decreasing tube diameter can improve issues with non-uniform heating, pressure drop is greatly increased.

Additionally, polymer fouling may occur in the preheaters. Polymer may foul and accumulate in the tube bundles in a STHE, especially when the tubes are long. When fouling occurs, the STHE must be shut down for cleaning and/or part replacement interrupting production of polymer and adding cost. Similar to a STHE, a PHE can be subject to that same disadvantages and limitations as well (e.g., fouling). While U.S. Pat. No. 9,708,428 discloses a spiral heat exchanger, it is disclosed for use in polymerizing a polymer.

Thus, there is a need in the art for new and improved polymerization processes where devolatilization of the polymer, particularly preheating of polymer solution, can be achieved without a high pressure drop, large temperature gradient and polymer fouling. The present disclosure provides polymerization processes where devolatilization of the polymer is achieved by preheating the polymer in spiral heat exchangers with increased heat transfer capabilities, smaller footprints, lower temperature gradients and lower pressure drops.

SUMMARY OF THE INVENTION

This invention relates to a process for producing a polymer, comprising: polymerizing a monomer dissolved in a solvent in the presence of a catalyst system under conditions to obtain a first effluent stream comprising a solution of the polymer and the solvent; heating the first effluent stream in at least one spiral heat exchanger to produce a second effluent stream, wherein the first effluent stream flows through the at least one spiral heat exchanger in a cross-flow direction relative to spirals of the at least one spiral heat exchanger; and performing a separation on the second effluent stream to produce: a third effluent stream comprising polymer substantially free of the solvent; and a recycle stream comprising the solvent and unreacted monomer.

In another aspect, this disclosure relates to a process for devolatilizing a polymer stream, wherein the process comprises: heating the polymer stream comprising a solution of the polymer, a solvent, and unreacted monomer in at least one spiral heat exchanger to produce a second effluent stream, wherein the polymer stream flows through the at least one spiral heat exchanger in a cross-flow direction relative to spirals of the at least one spiral heat exchanger; and performing a separation on the second effluent stream to produce: a third effluent stream comprising polymer substantially free of the solvent; and a recycle stream comprising the solvent and unreacted monomer.

BRIEF DESCRIPTION OF THE FIGURES

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE INVENTION

I. Definitions

Figure 1:
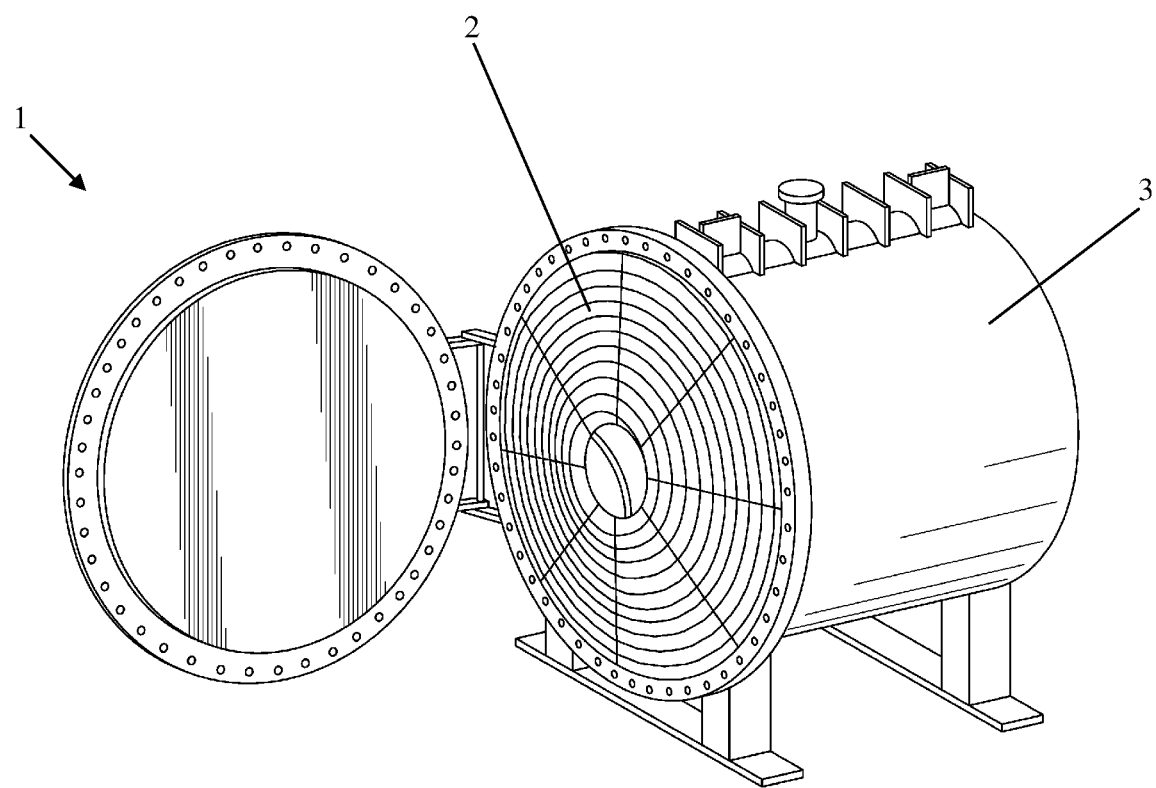
FIG. 1 illustrates a spiral heat exchanger according to an embodiment of the present disclosure.

To facilitate an understanding of the present invention, a number of terms and phrases are defined below.

As used in the present disclosure and claims, the singular forms "a," "an," and "the" include plural forms unless the context clearly dictates otherwise.

The term "and/or" as used in a phrase such as "A and/or B" herein is intended to include "A and B", "A or B", "A", and "B".

For the purposes of this invention and the claims thereto, the new numbering scheme for the Periodic Table Groups is used as described in CHEMICAL AND ENGINEERING NEWS, 63(5), pg. 27 (1985). Therefore, a "group 4 metal" is an element from group 4 of the Periodic Table, e.g. Hf, Ti, or Zr.

When an element or layer is referred to as being "on," "engaged to," "connected to," "attached to" or "coupled to" another element or layer, it may be directly on, engaged, connected, attached or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," and the like). As used herein, the term "and/or" includes any and all combinations of one or more of the associated listed items.

As used herein, the phrase "at least a portion of" means >0 to 100.0 wt % of the composition to which the phrase refers. The phrase "at least a portion of" refers to an amount ≤about 1.0 wt %, ≤about 2.0 wt %, ≤about 5.0 wt %, ≤about 10.0 wt %, ≤about 20.0 wt %, ≤ about 25.0 wt %, ≤about 30.0 wt %, ≤about 40.0 wt %, ≤about 50.0 wt %, ≤about 60.0 wt %, ≤about 70.0 wt %, ≤about 75.0 wt %, ≤about 80.0 wt %, ≤about 90.0 wt %, ≤about 95.0 wt %, ≤about 98.0 wt %, ≤about 99.0 wt %, or ≤about 100.0 wt %. Additionally or alternatively, the phrase "at least a portion of" refers to an amount ≥about 1.0 wt %, ≥about 2.0 wt %, ≥about 5.0 wt %, ≥about 10.0 wt %, ≥about 20.0 wt %, ≥about 25.0 wt %, ≥about 30.0 wt %, ≥about 40.0 wt %, ≥about 50.0 wt %, ≥about 60.0 wt %, ≥about 70.0 wt %, ≥ about 75.0 wt %, ≥about 80.0 wt %, ≥about 90.0 wt %, ≥about 95.0 wt %, ≥about 98.0 wt %, ≥about 99.0 wt %, or about 100.0 wt %. Ranges expressly disclosed include combinations of any of the above-enumerated values; e.g., about 10.0 to about 100.0 wt %, about 10.0 to about 98.0 wt %, about 2.0 to about 10.0 wt %, about 40.0 to 60.0 wt %, etc.

A "reaction zone" also referred to as a "polymerization zone" is a vessel where polymerization takes place, for example a batch reactor or continuous reactor. When multiple reactors are used in either series or parallel configuration, each reactor may be considered as a separate reaction zone or a separate polymerization zone. Alternatively, a reactor may include one or more reaction zones or polymerization zones. For a multi-stage polymerization in both a batch reactor and a continuous reactor, each polymerization stage is considered as a separate polymerization zone.

"Catalyst productivity" is a measure of how many grams of polymer (P) are produced using a polymerization catalyst comprising W g of catalyst (cat), over a period of time of T hours; and may be expressed by the following formula: $P/(T \times W)$ and expressed in units of $gPgcat^{-1}hr^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this invention, ethylene shall be considered an α-olefin.

For purposes of this invention and claims thereto, unless otherwise indicated, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group.

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are g/mol. The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, MAO is methylalumoxane, dme is 1,2-dimethoxyethane, TMS is trimethylsilyl, TIBAL is triisobutylaluminum, TNOAL is tri(n-octyl)aluminum, THF (also referred to as thf) is tetrahydrofuran, RT is room temperature (and is 25° C. unless otherwise indicated), tol is toluene, EtOAc is ethyl acetate, Np is neopentyl, and Cy is cyclohexyl.

A "catalyst system" is the combination of at least one catalyst compound, at least one activator, and an optional co-activator. For the purposes of this invention and the claims thereto, when catalyst systems are described as comprising neutral stable forms of the components, it is well understood by one of ordinary skill in the art, that the ionic form of the component is the form that reacts with the monomers to produce polymers. When "catalyst system" is used to describe such a catalyst/activator before activation, it means the unactivated catalyst complex (precatalyst) together with an activator, support and, optionally, a co-activator. When it is used to describe such after activation, it means the support, the activated complex, and the activator or other charge-balancing moiety. The transition metal compound may be neutral as in a precatalyst, or a charged species with a counter ion as in an activated catalyst system.

In the description herein, the metallocene catalyst may be described as a catalyst precursor, a pre-catalyst compound, metallocene catalyst compound or a transition metal compound, and these terms are used interchangeably. A metallocene catalyst is defined as an organometallic compound bonded to least one π-bound cyclopentadienyl moiety (or substituted cyclopentadienyl moiety) and more frequently two π-bound cyclopentadienyl moieties or substituted cyclopentadienyl moieties bound to a transition metal.

For purposes of this invention and claims thereto in relation to metallocene catalyst compounds, the term "substituted" means that a hydrogen group has been replaced with a hydrocarbyl group, a heteroatom, or a heteroatom containing group or where at least one heteroatom has been inserted within a hydrocarbyl ring. For example, methyl cyclopentadiene (Cp) is a Cp group substituted with a methyl group. Indene and fluorene (and substituted variants thereof) are substituted cyclopentadiene groups.

An "anionic ligand" is a negatively charged ligand which donates one or more pairs of electrons to a metal ion. A "neutral donor ligand" is a neutrally charged ligand which donates one or more pairs of electrons to a metal ion.

"Alkoxy" or "alkoxide" refers to an alkyl containing from 1 to about 10 carbon atoms. The alkoxy may be straight-chain, branched-chain or cyclic. Non-limiting examples include methoxy, ethoxy, propoxy, butoxy, isobutoxy, tert-butoxy, pentoxy, and hexoxy. "C1 alkoxy" refers to methoxy, "C2 alkoxy" refers to ethoxy, "C3 alkoxy" refers to propoxy and "C4 alkoxy" refers to butoxy.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one heteroatom or heteroatom containing group, such as halogen (such as Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl and the like including their substituted analogues.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Unless otherwise indicated, where isomers of a named alkyl, alkenyl, alkoxy, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

An oligomer is a polymer having a low molecular weight, such an Mn of less than 25,000 g/mol, or less than 2,500 g/mol, or a low number of mer units, such as 75 mer units or less or 50 mer units or less.

The term "continuous" means a system that operates without interruption or cessation. For example a continuous process to produce a polymer would be one where the reactants are continually introduced into one or more reactors and polymer product is continually withdrawn.

A "solution polymerization" means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res. 29, 2000, 4627.

A "bulk polymerization" means a polymerization process in which the monomers and/or comonomers being polymerized are used as a solvent or diluent using little or no inert solvent as a solvent or diluent. A small fraction of inert solvent might be used as a carrier for a catalyst and a scavenger. A bulk polymerization system contains less than 25 wt % of inert solvent or diluent, preferably less than 10 wt %, preferably less than 1 wt %, preferably 0 wt %.

"Laminar" flow refers to flow of a fluid (e.g., gas, liquid) in parallel layers without disruption between the layers. Fluids may exhibit laminar flow near a solid boundary. "Near-laminar" flow refers to flow of a fluid in parallel layers with minimal disruption between the layers.

II. Polymerization Process

A. Polymerizing Step

This disclosure relates to a polymerization process for forming polymer (e.g., polyolefin) comprising polymerizing a monomer in the presence of a catalyst system under conditions to obtain a first effluent comprising polymer (e.g., polyolefin).

The polymerization processes described herein may be carried out in any manner known in the art. Any solution, suspension, slurry, or gas phase polymerization process known in the art can be used. Such processes can be run in a batch, semi-batch, or continuous mode. Preferably, the polymerization process is continuous. Homogeneous polymerization processes (such as solution phase and bulk phase processes) are advantageous. A bulk process is defined to be a process where monomer concentration in all feeds to the reactor is 70 vol % or more. In useful bulk polymerization systems, no solvent or diluent is present or added in the reaction medium, (except for the small amounts used as the carrier for the catalyst system or other additives, or amounts typically found with the monomer; e.g., propane in propylene).

Alternately, the polymerization process is a slurry process. As used herein, the term "slurry polymerization process" means a polymerization process where a supported catalyst is employed and monomers are polymerized on the supported catalyst particles and at least 95 wt % of polymer products derived from the supported catalyst are in granular form as solid particles (not dissolved in the diluent). A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

One embodiment of the processes and systems disclosed herein involves a particle form polymerization, or a slurry process where the temperature is kept below the temperature at which the polymer goes into solution. Such technique is well known in the art, and described in, for instance, U.S. Pat. No. 3,248,179; which is fully incorporated herein by reference. The preferred temperature in the particle form process is within the range of about 85° C. to about 110° C.

Advantageously, the polymerization process may be a solution polymerization process wherein the monomer and catalyst system are contacted in a solution phase and polymer is obtained therein. In various aspects, a solvent may be present during the polymerization process. Suitable diluents/solvents for polymerization include non-coordinating, inert liquids. Examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated C4-10 alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream.

In various aspects where the polymerization process is a solution polymerization, the process may comprise polymerizing a monomer dissolved in a solvent as described herein in the presence of a catalyst system under conditions to obtain a first effluent comprising a solution of polymer (e.g., polyolefin) and solvent and/or unreacted monomer.

The polymerization processes may be conducted under conditions including a temperature of about 50° C. to about 220° C., preferably about 70° C. to about 210° C., preferably about 90° C. to about 200° C., preferably from 100° C. to 190° C., preferably from 130° C. to 160° C. The polymerization process may be conducted at a pressure of from about 120 to about 1800 psi (about 12,411 kPa), preferably from 200 to 1000 psi (about 1379 to 6895 kPa), preferably from 300 to 600 psi (about 2068 to 4137 kPa). Preferably, the pressure is about 450 psi (about 3103 kPa).

In a some embodiments, hydrogen may be present during the polymerization process at a partial pressure of 0.001 to 50 psig (0.007 to 345 kPa), preferably from 0.01 to 25 psig (0.07 to 172 kPa), more preferably 0.1 to 10 psig (0.7 to 70 kPa).

Once a suitable amount of polymer is produced, a quenching agent may be added to the first effluent stream in order to prevent further polymerization, i.e., quench the polymerization reaction. Any suitable quenching agents known in the art may be used, e.g., small, polar, protic molecules, such as water and methanol. Additionally or alternatively, polyhydric quenching agents with high molecular weights, such as those described in U.S. Patent Application Ser. No. 62/368,477, filed on Jul. 29, 2016, may be used.

B. Preheating and Separation of the First Effluent Stream

The solvent and/or unreacted monomer present in the first effluent with polymer (e.g., polyolefin) requires removal from the first effluent. Thus, the process described herein comprises heating the first effluent stream to a suitable temperature to produce a second effluent stream and performing at least one separation step on the second effluent stream. In certain variations, the first effluent may be heated in at least one spiral heat exchanger to produce a second effluent stream. As understood in the art, the at least one spiral heat exchanger includes a body formed by at least one spiral sheet wound to form spirals which are arranged radially around an axis of the spiral heat exchanger. The spirals form at least one flow channel for flow of a heat exchange medium. For example, as shown in FIG. 1, spirals 2 may be enclosed by a substantially cylindrical shell 3 in a spiral heat exchanger 1. Further, the cylindrical 3 shell may include at least one inlet (not shown) and at least one outlet (not shown) in fluid communication with the at least one flow channel for providing and removing the heat exchange medium.

Figure 2:
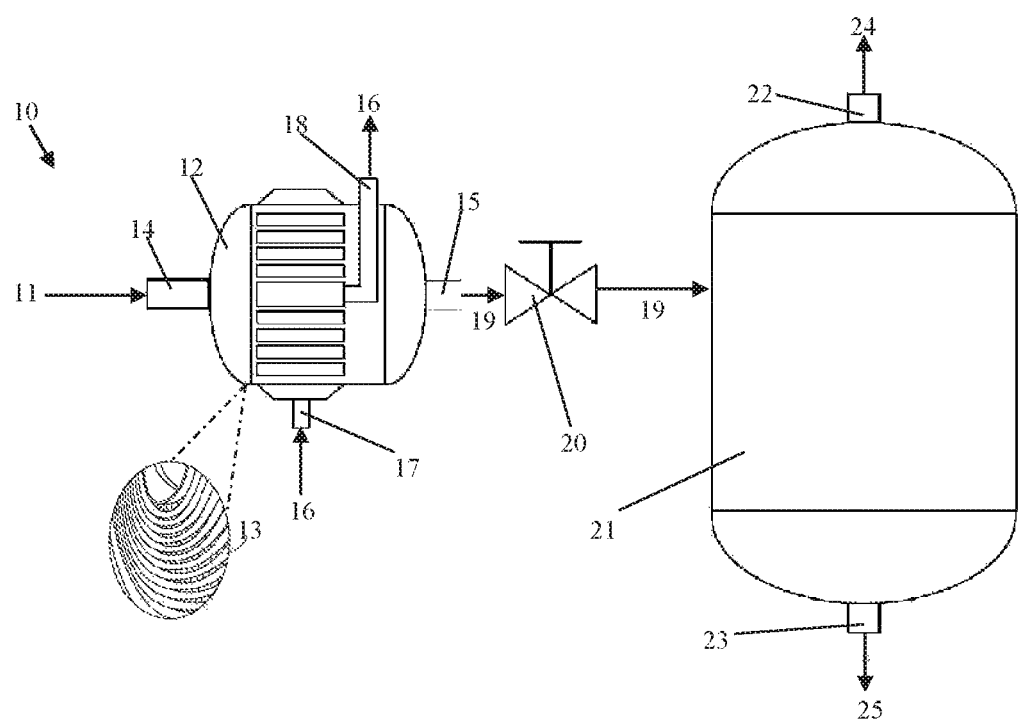
FIG. 2 illustrates a spiral heat exchanger preheater and separation vessel according to another embodiment of the present disclosure.

In particular, the at least one spiral heat exchanger may be oriented in a direction, for example, as shown in FIG. 2, such that a first effluent stream 11 flow in an axial direction through channels formed in between the spirals 13 of the at least one spiral heat exchanger 12 thereby heating the first effluent stream 11 as it travels through the at least one spiral heat exchanger to produce a second effluent stream 19 during devolatilization. In other words, the first effluent stream may flow through the at least one spiral heat exchanger in a cross-flow direction relative to the spirals of the at least one spiral heat exchanger. As used herein, "cross-flow" direction refers to a flow substantially orthogonal in direction to the spirals of the at least one spiral heat exchanger. Substantially orthogonal may include flow of first effluent stream at an angle of about 70° to about 110°, preferably about 80° to about 100°, preferably about 85° to about 95°, more preferably about 88° to about 92°, more preferably about 90° with respect to the spirals of the at least one spiral heat exchanger.

Additionally or alternatively, the at least one spiral heat exchanger may comprise a plurality of spiral heat exchangers, e.g., at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, etc. The plurality of spiral heat exchangers may be included in one heat exchanger and/or in multiple heat exchangers (e.g., 2, 3, 4, 5, 6, 7, 8 heat exchangers). Each spiral heat exchanger may be considered a separate preheater, or multiple spiral heat exchangers in one heat exchanger may cumulatively comprise one preheater.

The at least one spiral heat exchanger used in the processes described herein may be any suitable spiral heat exchanger known in the art. Non-limiting examples of suitable spiral heat exchangers include those described in U.S. Pat. Nos. 8,622,030; 8,075,845; 8,573,290; 7,640,972; 6,874,571; 6,644,391; 6,585,034; 4,679,621; and US Patent Publication Nos. 2010/0170665; 2010/0008833; 2002/0092646; 2004/0244968, each of which are incorporated by reference herein. Advantageously, the at least one spiral heat exchanger may have a surface area to volume ratio of about 20-30 ft$^2$/ft$^3$, while traditional STHEs have a surface area to volume ratio of about 2 ft$^2$/ft$^3$. Further, the spiral configuration in a spiral heat exchanger allows for higher heat transfer efficiency with a relatively low logarithmic mean temperature difference (LMTD). This low LMTD between the hot and cold fluids also results in a minimal radial temperature difference allowing for a more uniform temperature distribution in the spiral heat exchanger.

Additionally, the spiral heat exchanger may have an open channel height of 0.5 to 30 feet, preferably 1 to 25 feet, preferably 3 to 20 feet, preferably 5 to 15 feet, preferably 5 to 10 feet.

Suitable heat exchange medium is any typically used in the art that may flow through the spirals of the at least one spiral heat exchanger. Particularly useful heat exchange media are those stable at the heating temperatures, and typically include those stable at about 200° C. or more. Examples of heat transfer media include, inter alia, water and other aqueous solutions, oil (e.g., hydrocarbons, such as mineral oil, kerosene, hexane, pentane, and the like), and synthetic media, such as those available from The Dow Chemical Company (Midland, Mich.) under the trade name DOWTHERM™, such as grades A, G, J, MX, Q, RP, and T. If water is used, then it may be under a suitable amount of pressure to prevent boiling. Preferably, the heat exchange medium flows through the spirals at a temperature of about 60° C. to about 300° C., preferably about 75° C. to about 250° C., more preferably about 75° C. to about 215° C.

In various aspects, the second effluent stream exiting the at least one spiral heat exchanger may have a temperature of at least about 60° C., at least about 75° C., at least about 100° C., at least about 125° C., at least about 150° C., at least about 175° C., at least about 200° C., at least about 215° C., at least about 225° C., at least about 250° C., at least about 275° C., at least about 300° C., or at least about 325° C. Ranges expressly disclosed include combinations of any of the above-enumerated values, e.g., about 60° C. to about 325° C., about 75° C. to about 300° C., about 100° C. to about 275° C., about 125° C. to about 250° C., etc. Preferably, the second effluent stream exiting the at least one spiral heat exchanger has a temperature of about 60° C. to about 300° C., about 75° C. to about 250° C., or about 75° C. to about 215° C. The temperature of the second effluent stream exiting the heat exchanger is measured at line 18 of FIG. 2, within 2 meters from the exit nozzle 15 of the heat exchanger.

Additionally, use of the at least one spiral heat exchanger in the polymerization process described herein advantageously results in a lower pressure drop such that the first effluent stream may travel through the at least one spiral heat exchanger at a high flow rate, which can create a self-cleaning flow passage which is not as susceptible to fouling as compared to a STHE or a PHE. For example, a pressure drop across the at least one spiral heat exchanger may be ≤about 10.0 psi (about 69 kPa), about 15.0 psi (about 103 kPa), ≤about 20.0 psi (about 138 kPa), ≤about 25.0 psi (about 172 kPa), ≤about 30.0 psi (about 207 kPa), ≤about 35.0 psi (about 241 kPa), ≤about 40.0 psi (about 276 kPa), ≤about 45.0 psi (about 311 kPa), ≤about 50.0 psi (about 345 kPa), ≤about 55.0 psi (about 379 kPa), ≤about 60.0 psi (about 414 kPa), or ≤about 65.0 psi (about 448 kPa). Preferably, a pressure drop across the at least one spiral heat exchanger may be ≤about 60.0 psi (about 414 kPa), preferably ≤about 50.0 psi (about 345 kPa), or preferably ≤about 40.0 psi (about 276 kPa). Ranges expressly disclosed include combinations of any of the above-enumerated values, e.g., about 10.0 psi to about 65.0 psi (about 69 kPa to about 448 kPa), about 20.0 psi to about 60.0 psi (about 138 kPa to about 414 kPa), about 25.0 psi to about 55.0 psi (about 172 kPa to about 379 kPa), about 30.0 psi to about 50.0 psi (about 207 kPa to about 345 kPa), etc. The pressure drop across the at least one heat exchanger is measured by taking the difference of the pressure at the outlet of the heat exchanger (within 2 meters from the exit nozzle 15 at line 18 of FIG. 2) and the pressure at the inlet of the heat exchanger (within 2 meters upstream of the inlet nozzle 14 at first effluent stream 11 of FIG. 2).

Figure 3:
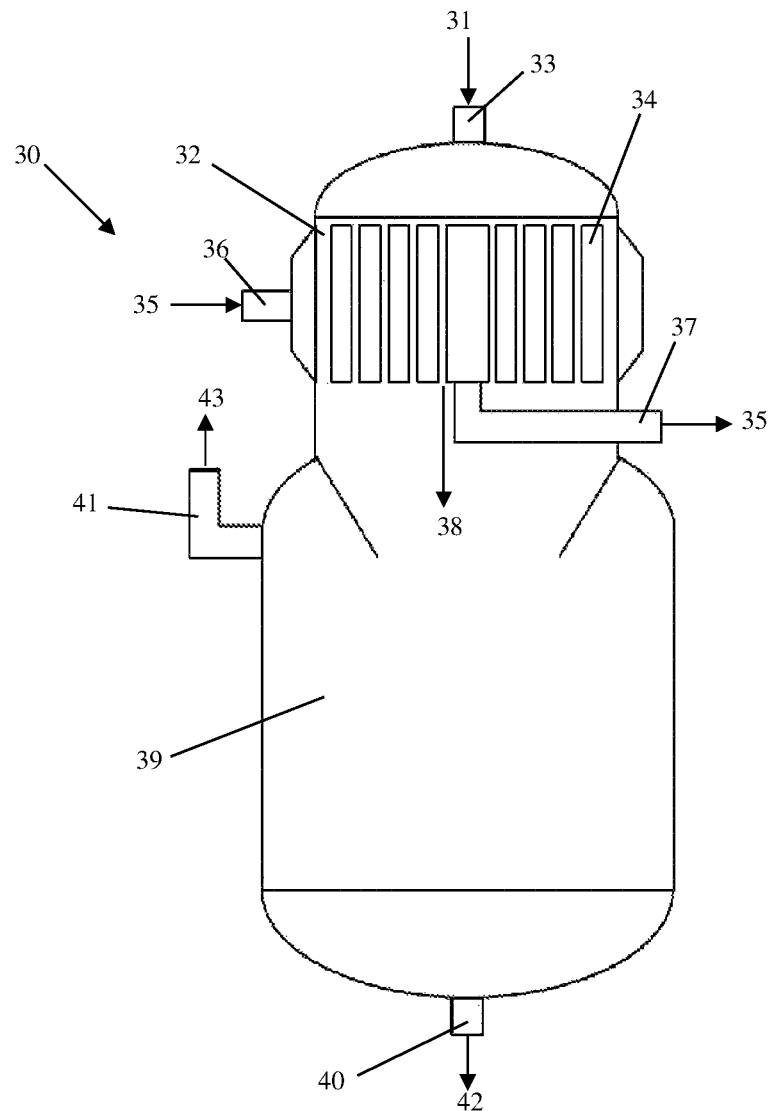
FIG. 3 illustrates a spiral heat exchanger preheater and separation vessel according to another embodiment of the present disclosure.

As discussed above, as shown in FIG. 2, at least one spiral exchanger 12 may be oriented in a substantially horizontal direction where a first effluent stream 11 may flow in a substantially horizontal direction through the least one spiral heat exchanger 12 in system 10 in a cross-flow direction relative to spirals 13. The orientation of the at least one spiral heat exchanger is not limited to such a horizontal orientation, but rather may be oriented in any direction so long as the first effluent stream flows through the at least one spiral heat exchanger in a cross-flow direction relative to the spirals of the at least one spiral heat exchanger. For example, at least one spiral heat exchanger 32 may be oriented in a substantially vertical direction, as shown in FIG. 3, where a first effluent stream 31 may flow through the at least one spiral heat exchanger 32 in a substantially vertical direction.

In various aspects, the separation step described herein may be performed in a vessel on the second effluent stream under suitable conditions to produce a third effluent stream and a recycle stream. Preferably, the third effluent stream comprises a concentrated polymer solution (greater than 30 wt %, preferably greater than 50 wt %, preferably greater than about 80 wt % polymer, based upon the weight of the solution) and solvent and/or unreacted monomer (less than about 70 wt %, preferably less than about 50 wt %, preferably less than about 20 wt %, based upon the weight of the solution).

The separation may be performed in any suitable vessel, e.g., a flash vessel, high pressure flash vessel, etc. The separation may be conducted under conditions including a temperature of from about 60° C. to about 325° C., preferably about 75° C. to about 300° C., preferably about 100° C. to about 275° C., about 125° C. to about 250° C., or preferably about 75° C. to about 215° C. Additionally or alternatively, the separation may be conducted with a pressure of about 0.10 psia to about 400 psia (about 0.7 kPa to about 2758 kPa), preferably about 0.10 psia to about 350 psia (about 2758 kPa to about 2413 kPa), or preferably about 0.20 psia to about 650 psia (about 1.4 kPa to about 4482 kPa). The temperature and pressure of the separator are measured at line 24 of FIG. 2, within 2 meters from the exit nozzle 22 of the recycle stream.

Typically, the first effluent stream comprises varying amounts of solids. Depending on the amount of solids present in the first effluent stream, the at least one spiral heat exchanger may either be connected to the vessel via a pressure valve or the at least one spiral heat exchanger may be connected directly to the vessel (devolatilizer). For example, as shown in FIG. 2, when the first effluent comprises less than about 60 wt % solids based on the total weight of the first effluent stream, the spiral heat exchanger 12 may be connected to the vessel 21 via a pressure valve 20. Such a configuration may maintain a substantial amount of the volatile components in a liquid state and substantially prevent the second effluent stream from rapidly expanding and causing safety and operational issues. Additionally or alternatively, the configuration in FIG. 2 may be used when the first effluent comprises ≤about 50 wt % solids, ≤about 40 wt % solids, ≤about 30 wt % solids, ≤about 20 wt % solids, ≤about 10 wt % solids or about 1.0 wt %, based on the total weight of the first effluent stream. Ranges expressly disclosed include combinations of any of the above-enumerated values, e.g., about 1.0 wt % to less than about 60 wt %, about 10 wt % to about 50 wt %, about 20 wt % to less than about 60 wt %, etc.

In particular, as shown in FIG. 2, a first effluent stream 11 may enter at least one spiral heat exchanger 12 via a inlet nozzle 14 in system 10. The first effluent stream 11 flows through the at least one spiral heat exchanger 12 in a cross-flow direction relative to spirals 13. A heat exchange medium stream 16 enters the at least one spiral heat exchanger 12 via a second inlet 17 at a suitable temperature as described above to heat the first effluent stream 11 as it travels through the spiral heat exchanger 12 to produce a second effluent stream 19, which exits the spiral heat exchanger 12 via a outlet nozzle 15. The heat exchange medium stream 16 exits the spiral heat exchanger 12 via a second outlet 18. The effluent stream 19 flows into a pressure valve 20 to maintain the volatile components in a liquid state. Then the second effluent stream 19 exits pressure valve 20 and is introduced into vessel 21 (e.g., high pressure flash vessel) via an inlet (not shown), where unreacted monomer and/or solvent is separated from polymer to produce a third effluent stream 25 comprising polymer substantially free of solvent and a line 24 comprising the solvent and/or unreacted monomer. The third effluent stream 25 may exit the vessel 21 via a third outlet 23, and the recycle stream 24 may exit the vessel 21 via a exit nozzle 22.

Alternatively as shown in FIG. 3, when the first effluent comprises more than about 60 wt % solids based on the total weight of the first effluent stream, a spiral heat exchanger 32 may be directly connected to vessel 39 in system 30. In particular, the spiral heat exchanger 32 may be mounted on top of vessel 39 such that the spiral heat exchanger 32 is near a zone of reduced pressure and the bubbling process. Since the volatile component content is lower, volume expansion is limited. Further, such a configuration where the second effluent is near the bubbling process is desirable because it may increase the surface area of the polymer solution exposed to the surrounding environment thereby accelerating vaporization of the volatile components. Additionally or alternatively, the configuration in FIG. 3 may be used when the first effluent comprises ≥about 70 wt % solids, ≥about 80 wt % solids, or ≥about 90 wt %, based on the total weight of the first effluent stream. Ranges expressly disclosed include combinations of any of the above-enumerated values, e.g., greater than about 60 wt % to about 90 wt %, greater than about 60 wt % to about 80 wt %, about 70 wt % to about 90 wt %, etc.

In particular, as shown in FIG. 3, a first effluent stream 31 may enter at least one spiral heat exchanger 32 via a third inlet 33 in system 30. The first effluent stream 31 may flow through the at least one spiral heat exchanger 32 in a cross-flow direction relative to spirals 34. A heat exchange medium stream 35 enters the at least one spiral heat exchanger 32 via a fourth inlet 36 at a suitable temperature as described above to heat the first effluent stream 31 as it travels through the spiral heat exchanger 32 to produce a second effluent stream 38. The heat exchange medium stream 35 exits the spiral exchanger 32 via a fifth outlet 37. The second effluent stream 38 exits the spiral heat exchanger 32 into a vessel 39, where unreacted monomer and/or solvent is separated from polymer to produce a third effluent stream 42 comprising polymer substantially free of solvent and/or unreacted monomer and a recycle stream 43 comprising the solvent and/or unreacted monomer. The third effluent stream 42 may exit the vessel 39 via a sixth outlet 40, and the recycle stream 43 may exit the vessel 39 via a seventh outlet 41.

In certain variations, the present disclosure contemplates embodiments drawn to systems 10 and 30 as provided in FIG. 2, and FIG. 3, respectively.

C. Recycle

In some embodiments, the process described herein, may further comprise recycling at least a portion of the recycle stream to be added during the polymerization step. Optionally, at least a portion of polymer (e.g., polyolefin) may be recycled back to the polymerization step. Polymer (e.g., polyolefin) may be produced with a recycle ratio of at least about 2, at least about 5, at least about 10, at least about 15, at least about 20, at least about 25, at least about 30, at least about 35, at least about 40, at least about 45, at least about 50, at least about 55, or at least about 60. Preferably, polymer (e.g., polyolefin) may be produced with a recycle ratio of at least about 5, at least about 20 or at least about 50. Preferably, polymer (e.g., polyolefin) may be produced with a recycle ratio of about 2 to about 60, preferably about 5 to about 50, preferably about 6 to about 35, preferably about 8 to about 20.

D. Monomers

Monomers useful herein include substituted or unsubstituted $C_2$ to $C_{40}$ olefins, preferably $C_2$ to $C_{20}$ olefins, preferably $C_2$ to $C_{12}$ olefins, preferably $C_2$ to $C_5$ olefins, preferably $C_2$ to $C_4$ olefins, preferably ethylene, propylene, butene, pentene, hexene, heptene, octene, nonene, decene, undecene, dodecene, and isomers thereof. In particular, the monomer comprises ethylene and/or propylene.

Other suitable monomers include $C_1$ to $C_{40}$ paraffins, preferably $C_1$ to $C_{20}$ paraffins, preferably $C_1$ to $C_{12}$ paraffins, preferably $C_1$ to $C_5$ paraffins, preferably $C_1$ to $C_4$ paraffins, preferably methane, ethane, propane, butane, pentane and isomers thereof. In particular, the monomer can comprise $C_2$ to $C_{40}$ olefins and/or $C_1$ to $C_4$ paraffins.

In one embodiment, the monomer comprises propylene and optional comonomers comprising one or more $C_2$ olefin (ethylene) or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In particular, the monomer comprises ethylene and/or propylene.

In another embodiment, the monomer comprises ethylene and optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment, one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Useful diolefin monomers include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene. Particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mol). Preferred cyclic dienes include cyclopentadiene, vinylnorbornene, norbornadiene, ethylidene norbornene, divinylbenzene, dicyclopentadiene, or higher ring containing diolefins, with or without substituents at various ring positions.

E. Polymers

This disclosure also describes polymer compositions of matter produced by the methods described herein.

In a preferred embodiment, a process described herein produces homopolymers and copolymers of one, two, three, four or more $C_2$ to $C_{40}$ olefin monomers, preferably $C_2$ to $C_{20}$ alpha olefin monomers. Particularly useful monomers include ethylene, propylene, butene, pentene, hexene, heptene, octene, nonene, decene, undecene, dodecene, isomers thereof, and mixtures thereof.

Likewise, the processes of this disclosure produce olefin polymers, preferably polyethylene and polypropylene homopolymers and copolymers. In a preferred embodiment, the polymers produced are homopolymers of ethylene or homopolymers of propylene. In particular, the polymer comprises polyethylene and/or polypropylene.

Alternately, the polymers produced herein are copolymers of a $C_2$ to $C_{40}$ olefin and one, two, or three or more different $C_2$ to $C_{40}$ olefins, (where the $C_2$ to $C_{40}$ olefins are preferably $C_3$ to $C_{20}$ olefins, preferably $C_3$ to $C_{12}$ alpha-olefin, preferably propylene, butene, hexene, octene, decene, dodecene, preferably propylene, butene, hexene, octane, or a mixture thereof).

In certain variations, the polymers produced herein (e.g., polyethylene, polypropylene) further comprise a $C_2$ to $C_{40}$ comononer, preferably a $C_2$ to $C_{20}$ comononer, preferably ethylene, propylene, butene, hexene, octene, decene, undecene, dodecene, or a mixture thereof.

Alternately, the polymers produced herein are copolymers of ethylene preferably having from 0 to 25 mol % (alternately from 0.5 to 20 mol %, alternately from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene).

Alternately, the polymers produced herein are copolymers of propylene preferably having from 0 to 25 mol % (alternately from 0.5 to 20 mol %, alternately from 1 to 15 mol %, preferably from 3 to 10 mol %) of one or more of $C_2$ or C$_4$ to C$_{20}$ olefin comonomers (preferably ethylene or C$_4$ to C$_{12}$ alpha-olefin, preferably ethylene, butene, hexene, octene, decene, dodecene, preferably ethylene, butene, hexene, octene).

Typically, the polymers produced herein have a M$_w$ of 5000 to 1000000 g/mol (preferably 25000 to 750000 g/mol, preferably 50000 to 500000 g/mol), and/or a M$_w$/M$_n$ of greater than 1 to 40 (alternately 1.2 to 20, alternately 1.3 to 10, alternately 1.4 to 5, 1.5 to 4, alternately 1.5 to 3).

In a preferred embodiment a polymer produced herein has a unimodal or multimodal molecular weight distribution as determined by Gel Permeation Chromatography (GPC). As used herein, "unimodal" means that the GPC trace has one peak or inflection point; "multimodal" means that the GPC trace has at least two peaks or inflection points. An inflection point is that point where the second derivative of the curve changes in sign (e.g., from negative to positive or vice versa).

Unless otherwise indicated M$_w$, M$_n$, and MWD are determined by GPC as described in US 2006/0173123 pages 24 and 25, paragraphs [0334] to [0341].

In a preferred embodiment the polymer (e.g., polyolefin) produced herein has a composition distribution breadth index (CDBI) of 50% or more, preferably 60% or more, preferably 70% or more. CDBI is a measure of the composition distribution of monomer within the polymer chains and is measured by the procedure described in PCT publication WO 93/03093, published Feb. 18, 1993, specifically columns 7 and 8 as well as in Wild et al. (1982) *J. Poly. Sci., Poly. Phys. Ed.* 20:441, and U.S. Pat. No. 5,008,204.

In various aspects, polymer (e.g., polyolefin) may be produced at a rate of ≥about 1 pounds per hour per gallon of reactor volume, ≥about 2 pounds per hour per gallon of reactor volume, ≥about 4 pounds per hour per gallon of reactor volume, ≥about 6 pounds per hour per gallon of reactor volume, or ≥about 8 pounds per hour per gallon of reactor volume. Preferably, polymer (e.g., polyolefin) is produced at a rate of ≥about 1 pounds per hour per gallon of reactor volume, ≥about 6 pounds per hour per gallon of reactor volume, or ≥about 8 pounds per hour per gallon of reactor volume. Ranges expressly disclosed include combinations of any of the above-enumerated values, e.g., about 1 to about 8 pounds per hour per gallon of reactor volume, about 2 to about 8 pounds per hour per gallon of reactor volume, about 4 to about 8 pounds per hour per gallon of reactor volume, etc. Preferably, polymer (e.g., polyolefin) is produced at a rate of about 1 to about 8 pounds per hour per gallon of reactor volume.

The polymers may be stabilized and formed into pellets using conventional equipment and methods, such as by mixing the polymer and a stabilizer (such as antioxidant) together directly in a mixer (e.g., a single or twin-screw extruder) and then pelletizing the combination. Additionally, additives may be included in the pellets. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; talc; and the like.

F. Polymer Blends

In another embodiment, the polymer (preferably the polyethylene or polypropylene) produced is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene or polypropylene) is present in the above blends, from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; talc; and the like.

G. Films

Specifically, any of the foregoing polymers, such as the foregoing polypropylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or double bubble processes and may occur before or after the individual layers are brought together. For example, a polyethylene layer can be extrusion coated or laminated onto an oriented polypropylene layer or the polyethylene and polypropylene can be coextruded together into a film, then oriented. Likewise, oriented polypropylene can be laminated to oriented polyethylene, or oriented polyethylene can be coated onto polypropylene, then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment, the film is oriented to the same extent in both the MD and TD directions.

The films may vary in thickness depending on the intended application; however, films of a thickness from 1 to 50 pin are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

H. Catalyst System

Any known polymerization catalyst, for example a Ziegler-Natta catalyst system, chromium catalysts, metallocene catalyst system, pyridyldiamide catalyst or other single-site catalysts, or a combination thereof including a bimetallic (i.e, Z/N and/or metallocene) catalyst, can be used in this invention. Preferred catalysts are those capable of polymerizing a $C_2$ to $C_{20}$ olefin to produce a polymer having a weight averaged molecular weight of 5,000 g/mol or more at a polymerization temperature of 60° C. or higher. The catalyst system used in the polymerization process described herein may comprise a catalyst and an activator. The catalyst and activator may be combined in any order. For example, the catalyst and the activator may be combined prior to contacting the monomer. Alternatively, the activater may be added to a solution of the monomer and the catalyst. Preferably, the activator and catalyst are contacted to form the catalyst system prior to entering a reaction zone. As used herein, "immediately" refers to a period of time of about 1 to about 120 seconds, preferably about 1 to about 60 seconds, preferably about 1 to 30 seconds before the activator and the catalyst enter a reaction zone. Additionally or alternatively, the activator may be introduced to a recycle stream comprising the monomer, the catalyst system and the polymer.

1. Metallocene Compounds

Representative metallocene-type compounds useful herein are represented by the formula:

$$T_jL_AL_BL_{Ci}MDE$$

where, M is a group 3, 4, 5, or 6 transition metal atom, or a lanthanide metal atom, or actinide metal atom, preferably a group 4 transition metal atom selected from titanium, zirconium or hafnium; LA, an ancillary ligand, is a substituted or unsubstituted monocyclic or polycyclic arenyl pi-bonded to M; LB is a member of the class of ancillary ligands defined for LA, or is J, a hetero-atom ancillary ligand bonded to M through the heteroatom; the LA and LB ligands may be covalently bridged together through a bridging group, T, containing a group 14, 15 or 16 element or boron wherein j is 1 if T is present and j is 0 if T is absent (j equals 0 or 1); LCi is an optional neutral, non-oxidizing ligand having a dative bond to M (i equals 0, 1, 2 or 3); and, D and E are independently mono-anionic labile ligands, each having a sigma-bond to M, optionally bridged to each other or to LA, LB or LC.

Catalyst compounds that are particularly useful in this invention include one or more of the metallocene compounds listed and described in Paragraphs [0089]-[0162] of US 2015-0025209, incorporated by reference herein.

Likewise, the catalyst compounds described herein may be synthesized in any suitable manner, including in accordance with procedures described in Paragraphs [0096] and [00247]-[00298] of U.S. Ser. No. 14/325,449, filed Jul. 8, 2014 and published as US 2015/0025209.

2. Ziegler-Natta Catalyst

Suitable catalysts for use in the processes and systems disclosed herein include Ziegler-Natta catalysts comprising 1) a solid titanium catalyst component comprising a titanium compound, a magnesium compound, and an internal electron donor; 2) a co-catalyst such as an organoaluminum compound, and 3) external electron donor(s). Ziegler-Natta catalysts, catalyst systems, and preparations thereof include supported catalyst systems described in U.S. Pat. Nos. 4,990,479, 5,159,021, and WO 00/44795, preferably including solid titanium and or magnesium.

3. Pyridyldiamido Compound

Another suitable catalyst for use in the processes and systems disclosed herein include pyridyldiamido compounds. The term "pyridyldiamido compound", "pyridyldiamido complex" or "pyridyldiamide complex" or "pyridyldiamido catalyst" or pyridyldiamide catalyst" refers to a class of coordination complexes described in U.S. Pat. No. 7,973,116, US 2012/0071616, US 2011/0224391, US 2011/0301310, US 2014/0221587, US 2014/0256893, US 2014/0316089, US 2015/0141590, and US 2015/0141601, incorporated herein by reference, that feature a dianionic tridentate ligand that is coordinated to a metal center through one neutral Lewis basic donor atom (e.g., a pyridine group) and a pair of anionic amido or phosphido (i.e., deprotonated amine or phosphine) donors.

In some embodiments, two or more different catalyst compounds are present in the catalyst system used herein. In some embodiments, two or more different catalyst compounds are present in the reaction zone where the process(es) described herein occur. When two transition metal compound based catalysts are used in one reactor as a mixed catalyst system, the two transition metal compounds are preferably chosen such that the two are compatible. A simple screening method such as by $^1H$ or $^{13}C$ NMR, known to those of ordinary skill in the art, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane should be contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

4. Activators

The terms "co-catalyst" and "activator" are used herein interchangeably and are defined to be any compound which can activate any one of the catalyst precursor compounds described herein by converting the neutral catalyst precursor compound to a catalytically active catalyst compound. Non-limiting activators, for example, include alumoxanes, aluminum alkyls, ionizing activators (also referred to as non-coordinating anion activators), which may be neutral or ionic, and conventional-type co-catalysts. Preferred activators typically include, alumoxane compounds, modified alumoxane compounds, and ionizing anion precursor compounds that abstract a reactive, σ-bound ligand (for example, chloride or alkyl, most often methyl) making the metal complex cationic and providing a charge-balancing noncoordinating or weakly coordinating anion.

5. Optional Scavengers and Chain Transfer Agents

In some embodiments, when using the complexes described herein, the catalyst system will additionally comprise one or more scavenging compounds. Here, the term scavenging compound means a compound that removes polar impurities from the reaction environment. These impurities adversely affect catalyst activity and stability. Typically, the scavenging compound will be an organometallic compound such as the Group 13 organometallic compounds of U.S. Pat. Nos. 5,153,157; 5,241,025; and WO-A-91/09882; WO-A-94/03506; WO-A-93/14132; and that of WO 95/07941.

6. Optional Support Materials

In some embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

I. Additives

Other additives may also be used in the polymerization, as desired, such as one or more, scavengers, promoters, modifiers, chain transfer agents, co-activators, reducing agents, oxidizing agents, hydrogen, aluminum alkyls, or silanes.

Aluminum alkyl compounds which may be utilized as scavengers or co-activators include, for example, one or more of those represented by the formula AlR3, where each R is, independently, a $C_1$-$C_8$ aliphatic radical, preferably methyl, ethyl, propyl, butyl, pentyl, hexyl octyl or an isomer thereof), especially trimethylaluminum, triethylaluminum, triisobutylaluminum, tri-n-hexylaluminum, tri-n-octylaluminum or mixtures thereof.

In a preferred embodiment, little or no scavenger is used in the process to produce the polymer, such as ethylene polymer. Preferably, scavenger (such as trialkyl aluminum, AlR3 as defined above) is present at zero mol %, alternately the scavenger is present at a molar ratio of scavenger metal to transition metal of less than 100:1, preferably less than 50:1, preferably less than 15:1, preferably less than 10:1.

Useful chain transfer agents that may also be used herein are typically a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, tri-octylaluminum, or a combination thereof.

III. Processes for Devolatilizing a Polymer Stream

In other embodiments, processes for devolatilizing a polymer stream are provided herein. The processes comprise heating the polymer stream comprising a solution of the polymer, a solvent, and unreacted monomer in at least one spiral heat exchanger as described herein to produce a second effluent stream. The polymer stream may flow through the at least one spiral heat exchanger in a cross-flow direction as described herein relative to spirals of the spiral heat exchanger. The at least one spiral heat exchanger may have a pressure drop as described herein (e.g., the pressure drop across the spiral heat exchanger may be less than or equal to about 50 psi-about 345 kPa). Additionally, the second effluent stream may have a temperature as described herein (e.g., about 75° C. to about 215° C.).

The process may further comprise performing at least one separation step as described herein on the first effluent stream. In particular, a separation step may be performed in a vessel, e.g., a flash vessel, high pressure flash vessel, on the first effluent stream under suitable conditions to produce a third effluent stream and a recycle stream. The third effluent stream may comprise polymer (e.g., polyolefin) as described herein, which is substantially free of solvent, and the quenching agent. In particular, the polymer polyethylene and/or polypropylene and optionally, further comprises a $C_2$ to $C_{20}$ co-monomer, e.g., selected from the group consisting of ethylene, propylene, butene, pentene, hexene, heptene, octene, nonene, decene, undecene, dodecene or a mixtures thereof.

The recycle stream may comprise the solvent as described herein and unreacted monomer as described herein.

In various aspects, the separation step can be performed under conditions as described herein (e.g., at a temperature of about 75° C. to about 215° C. and/or a pressure of about 0.20 psia to about 650 psia, about 1.4 kPa to about 4482 kPa).

In certain variations, where the polymer stream has a solids content as described herein, e.g., less than about 60 wt % solids based on the total weight of the polymer stream, the at least one spiral heat exchanger may be connected to the vessel via a pressure valve. Alternatively, when the polymer stream comprises more than about 60 wt % solids based on the total weight of the polymer stream, the at least one spiral heat exchanger may be directly connected to vessel.

In an embodiment of the processes and systems disclosed herein, the processes described using the spiral heat exchangers described herein can be simulated on a computer using process simulation software in order to generate process simulation data in a human-readable form (i.e., a computer printout or data displayed on a screen, a monitor, or other viewing device). The simulation data can then be used to manipulate the operation of the polymer production system and/or design the physical layout of a polymer production facility. In one embodiment, the simulation results can be used to design a new polymer production facility or expand an existing facility to integrate spiral heat exchanger(s). In another embodiment, the simulation results can be used to optimize the polymer production according to one or more operating parameters, such as varying the flow rate of the stripping agent. Examples of suitable software for producing the simulation results include commercial simulation software Aspen Plus v8.8 (34.0.0.110) with Aspen Polymers Module integrated from Aspen Technology, Inc., and PRO/ILR™ from Simulation Sciences Inc.

EXAMPLES

Example 1—Comparison of Shell and Tube Heat Exchanger and Spiral Heat Exchanger Under Same Conditions HTRI Xchanger Suite 7.2 was used to evaluate the performance between a shell and tube heat exchanger (STHE) and a spiral heat exchanger (SHE) under the same operational conditions. The process conditions, unit geometry, and exchanger performance are summarized in Tables 1 and 2 below. The example system used mineral oil as the hot/shell/utility side and a linear low density polyethylene/isohexane solution as the cold/tube/process side.

Example 1a—Pressure Drop in STHE and SHE as a Function of Polymer Solution Viscosity In Example 1a, the viscosity of the polymer solution was increased from 2000 cP to 20,000 cP to 200,000 cP, and the pressure drop was determined for the STHE and SHE. As shown in Table 1, the pressure drop of STHE increased from 3.2 psi to 654.4 psi (about 22.1 kPa to about 4511.9 kPa), while the pressure drop of the SHE only increased from 0.4 psi to 442.2 psi (about 2.8 kPa to about 3048.9 kPa).

TABLE 1

Pressure Drop in STHE and SHE as a Function of Polymer Solution Viscosity

| | Type | STHE | SHE |
|---|---|---|---|
| Viscosity of Polymer Solution (cP) | Process Condition | Hot/shell/utility side: Heat Transfer Fluid, Mass Flowrate = 30 klb/hr Cold/tube/process side: Polyolefin Solution, Mass Flowrate = 30 klb/hr LMTD* = 45 | |
| | Unit Geometry | Tube OD⁺ = 1 in (2.5 cm) Tube Pass = 1 Tube Length = 8 ft (2.4 m) Tube Count = 187 Counter Flow | Space width = 0.3 in (0.8 cm) Plate thickness = 0.14 in (0.4 cm) Core diameter = 6 in (15.2 cm) Exchanger Length = 1 ft (0.3 m) Cross Flow |
| 2000 | Pressure Drop (psi)/(kPa) | 3.2/22.1 | 0.4/2.8 |
| 20,000 | Pressure Drop (psi)/(kPa) | 29.9/206.2 | 4.4/30.3 |
| 200,000 | Pressure Drop (psi)/(kPa) | 296.0/2040.9 | 44.2/304.7 |

*LMTD = logarithmic mean temperature difference
⁺OD = outer diameter

Example 1B—Pressure Drop in STHE and SHE as a Function of Polymer Solution Viscosity In Example 1B, volumetric flowrate was increased from 10 gallons per minute (gpm) (about 38 liters per minute) to 25 gpm (about 95 liters per minute) to 50 gpm (about 189 liters per minute) and to 100 gpm (about 380 liters per minute) and the heat transfer coefficient was determined for the STHE and SHE. The heat transfer coefficient ratio between STHE and SHE, calculated by dividing the heat transfer coefficient of the SHE over the STHE at the same temperature, increased from 1.8 to 2.2.

TABLE 2

Heat Transfer Coefficient of STHE and SHE as a Function of Volumetric Flowrate of Fluid in the Process Side

| | Type | STHE | SHE |
|---|---|---|---|
| Process Side Volume Flowrate (gpm)/(liters per minute) | Process Condition | Hot/shell/utility side: Heat Transfer Fluid, $T_{in}$ = 110° F. (43° C.), $T_{out}$ = 95° F. (35° C.), Viscosity = 1.1 cP Cold/tube/process side: Polyolefin Solution, $T_{in}$ = 50° F. (10° C.), $T_{out}$ = 65° F. (18° C.), Viscosity = 1250 cP LMTD = 45 | |
| | Unit Geometry | Tube OD = 1 in (2.5 cm) Tube Pass = 1 Tube Length = 8 ft (2.4 m) Tube Count = 187 Counter Flow | Space width = 0.3 in (0.8 cm) Plate thickness = 0.14 in (0.4 cm) Core diameter = 6 in (15.2 cm) Exchanger Length = 1 ft (0.3 m) Cross Flow |
| 10/38 | Heat Transfer Coefficient (Btu/hr-F-ft²)/(W/m²-° C.) | 7.8/44.3 | 9.2 |

TABLE 2-continued

Heat Transfer Coefficient of STHE and SHE as a Function
of Volumetric Flowrate of Fluid in the Process Side

|  | Type | STHE | SHE |
|---|---|---|---|
| 25/95 | Heat Transfer Coefficient $(Btu/hr\text{-}F\text{-}ft^2)/(W/m^2\text{-}°\ C.)$ | 9.3/52.8 | 14.5 |
| 50/189 | Heat Transfer Coefficient $(Btu/hr\text{-}F\text{-}ft^2)/(W/m^2\text{-}°\ C.)$ | 11.0/62.5 | 20.5 |
| 100/380 | Heat Transfer Coefficient $(Btu/hr\text{-}F\text{-}ft^2)/(W/m^2\text{-}°\ C.)$ | 13.2/75.0 | 29.0 |

Overall, Example 1a and 1b indicate that SHE was more efficient in heat transfer and has a lower pressure drop compared to STHE.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise, whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements, and vice versa.

What is claimed is:

1. A process for producing a polymer comprising:
    polymerizing a monomer dissolved in a solvent in the presence of a catalyst system to obtain a first effluent stream, comprising a solution of polymer in the solvent;
    heating the first effluent stream in at least one spiral heat exchanger to produce a second effluent stream, wherein the first effluent stream flows through the at least one spiral heat exchanger in a cross-flow direction relative to spirals of the at least one spiral heat exchanger, wherein pressure drop across the at least one spiral heat exchanger is less than or equal to about 345 kPa, wherein the second effluent stream has a temperature at the outlet of the at least one spiral heat exchanger of about 75° C. to about 215° C.; and
    separating the second effluent stream in a vessel into:
        a third effluent stream comprising polymer substantially free of the solvent and a recycle stream comprising the solvent and unreacted monomer.

2. The process of claim 1, wherein the second effluent stream is separated in the vessel at an average vessel temperature of about 75° C. to about 215° C. and an average vessel pressure of about 1.4 kPa to about 4482 kPa.

3. The process of claim 1, wherein when the first effluent stream comprises less than about 60% polymer, the second effluent stream is depressurized in a pressure valve before being separated into the third effluent stream, wherein the pressure valve is fluidly connected to the at least one spiral heat exchanger and the vessel.

4. The process of claim 1, wherein when the first effluent stream comprises more than about 60% polymer, the at least one spiral heat exchanger is fluidly connected to the vessel.

5. The process of claim 1, wherein the catalyst system comprises a coordination catalyst.

6. The process of claim 1, wherein the polymer comprises polyethylene and/or polypropylene.

7. The process of claim 1, wherein the monomer comprises $C_2$-$C_{40}$ olefins and/or $C_1$-$C_4$ paraffins.

8. The process of claim 1, wherein the monomer comprises ethylene and/or propylene.

9. The process of claim 1, wherein the polymer comprises a $C_2$ to $C_{20}$ comonomer.

10. The process of claim 9, wherein the $C_2$ to $C_{20}$ comonomer is selected from the group consisting of ethylene, propylene, butene, pentene, hexene, heptene, octene, nonene, decene, undecene, dodecene and a mixture thereof.

11. A process for devolatilizing a polymer stream comprising:
    heating a polymer stream comprising a solution of a polymer, a solvent, and unreacted monomer in at least one spiral heat exchanger to produce a second effluent stream, wherein the polymer stream flows through the at least one spiral heat exchanger in a cross-flow direction relative to spirals of the at least one spiral heat exchanger, wherein pressure drop across the at least one spiral heat exchanger is less than or equal to about 345 kPa, wherein the second effluent stream has a temperature at the outlet of the at least one spiral heat exchanger of about 75° C. to about 215° C.; and
    separating the second effluent stream in a vessel into:
        a third effluent stream comprising polymer substantially free of the solvent; and
        a recycle stream comprising the solvent and unreacted monomer.

12. The process of claim 11, wherein the separation is performed in the vessel at an average vessel temperature of about 75° C. to about 215° C. and an average vessel pressure of about 1.4 kPa to about 4482 kPa.

13. The process of claim 11, wherein when the polymer stream comprises less than about 60% polymer, the second effluent stream is depressurized in a pressure valve before being separated into the third effluent stream, wherein the pressure valve is fluidly connected to the at least one spiral heat exchanger and the vessel.

14. The process of claim 11, wherein when the polymer stream comprises more than about 60% polymer, the at least one spiral heat exchanger is fluidly connected to the vessel.

15. The process of claim 11, wherein the polymer comprises polyethylene and/or polypropylene.

16. The process of claim 15, wherein the polymer comprises a $C_2$ to $C_{20}$ co-monomer selected from the group consisting of ethylene, propylene, butene, pentene, hexene, heptene, octene, nonene, decene, undecene, dodecene and a mixture thereof.

* * * * *